Sept. 29, 1925. 1,555,040
M. J. ULINE
ICE SCORING MACHINE
Filed Aug. 19, 1921 2 Sheets-Sheet 1
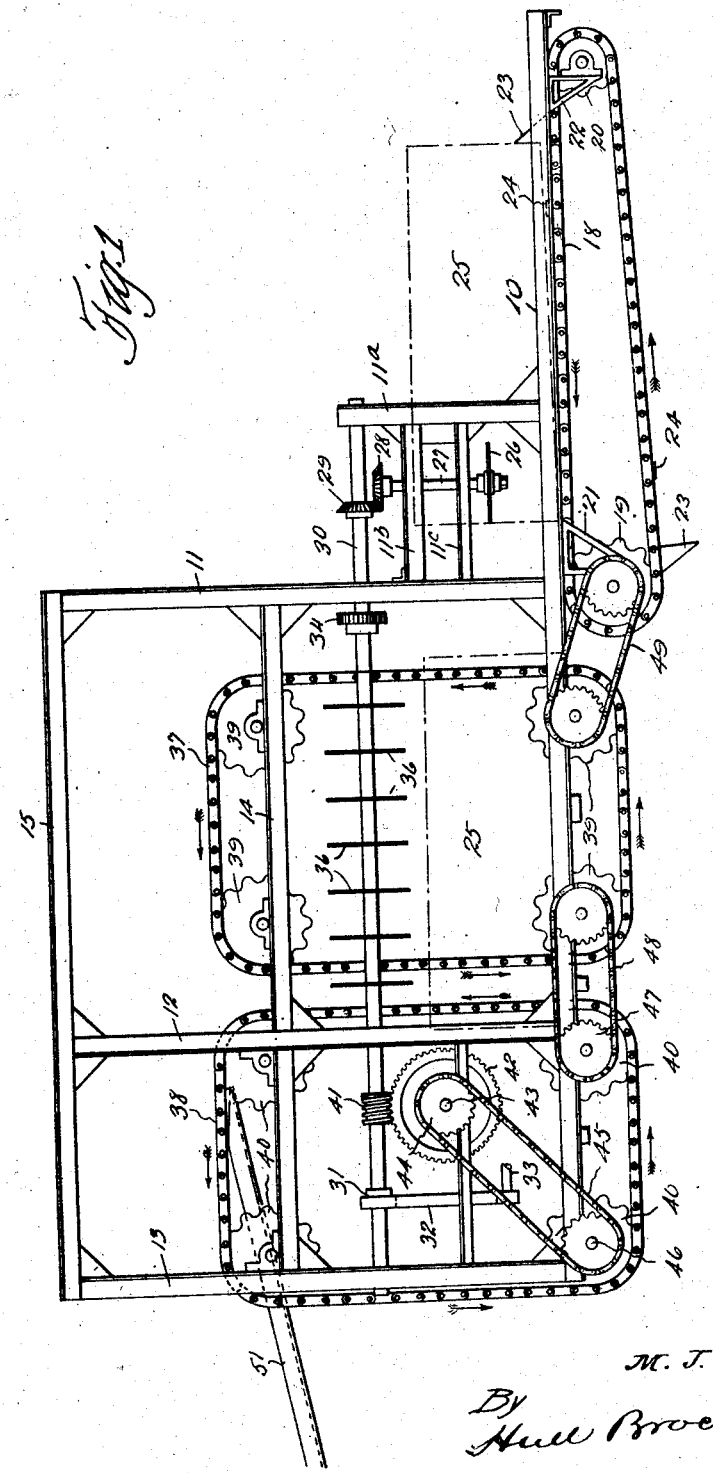

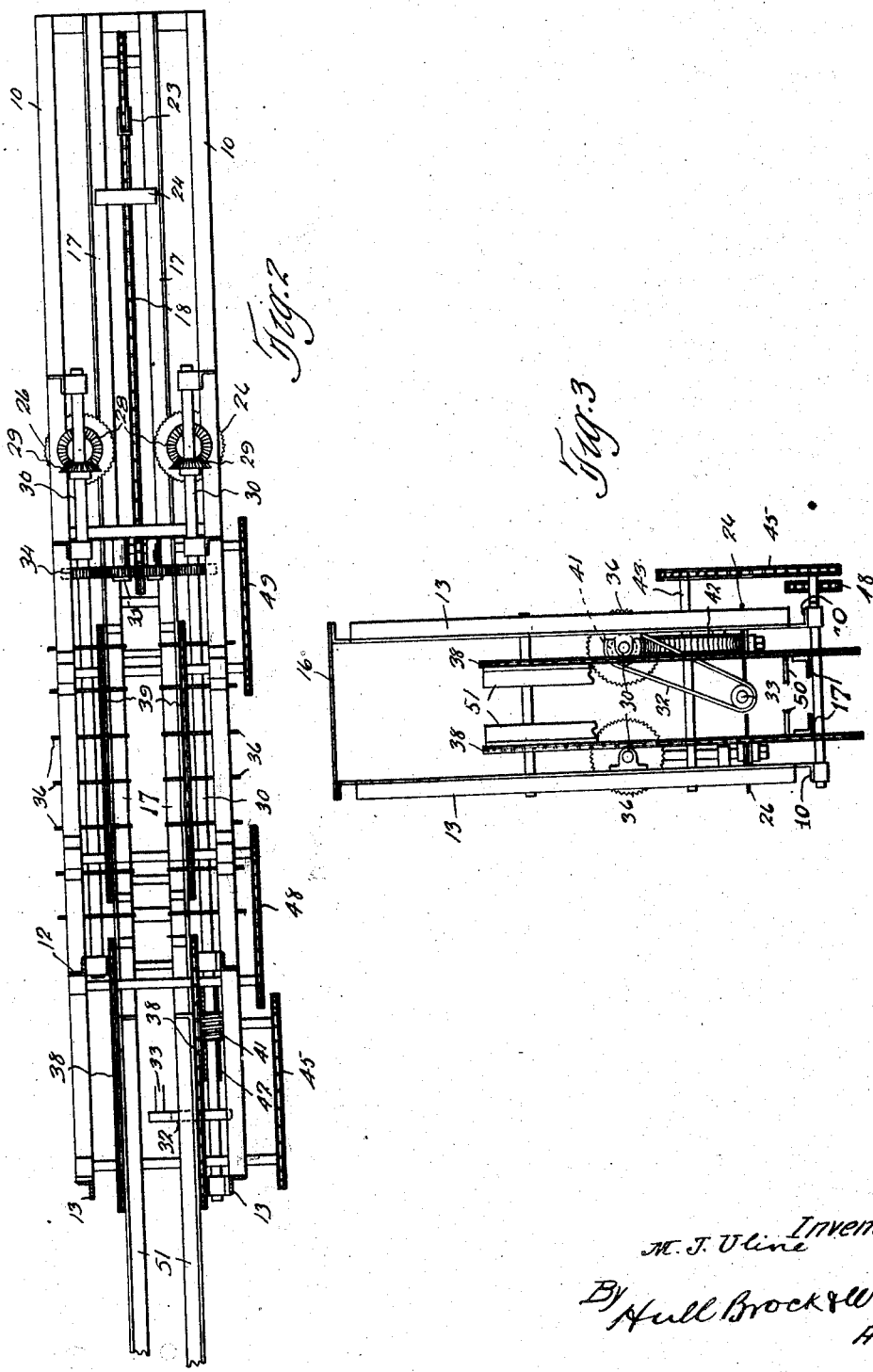

Patented Sept. 29, 1925.

1,555,040

UNITED STATES PATENT OFFICE.

MICHIEL J. ULINE, OF TOLEDO, OHIO, ASSIGNOR, BY MESNE ASSIGNMENTS, TO THE ULINE ICE-SCORING MACHINE COMPANY, OF WILMINGTON, DELAWARE, A CORPORATION OF DELAWARE.

ICE-SCORING MACHINE.

Application filed August 19, 1921. Serial No. 493,525.

*To all whom it may concern:*

Be it known that I, MICHIEL J. ULINE, a citizen of the United States, residing at Toledo, in the county of Lucas and State of Ohio, have invented a certain new and useful Improvement in Ice-Scoring Machines, of which the following is a full, clear, and exact description, reference being had to the accompanying drawings.

This invention relates to an improved device for scoring a block or cake of ice in such a manner that it can be quickly and easily and accurately divided into a number of smaller blocks or pieces by the aid of an ordinary ice pick or other suitable tool. The ordinary commercial cake of ice is made a definite size and shape and weight and is supplied to the drivers of ice delivery wagons in such form and the driver subdivides the same according to the needs of the customers. It is the object of the present invention to accurately indicate lines of division which can be followed in subdividing the cake into definite unit weight.

Another object of the invention is to provide an exceedingly simple and inexpensive device which will quickly and accurately apply the scoring marks to the ice, and also to compensate for the tapered form of the standard cake of ice so that each and every subdivision thereof will be of the same weight. A still further object of the invention is to provide a device which can be conveniently installed upon any ice house platform.

With these various objects in view the invention consists in the novel features of construction and in the manner of combining or arranging the same, all of which will be fully described hereinafter and pointed out in the claims.

In the drawings forming a part of this specification, Fig. 1 is a side elevation of an ice scoring device constructed in accordance with my invention; Fig. 2 is a top plan view of the same and Fig. 3 is an end view. In carrying out my invention I employ a frame, preferably constructed of angle iron and comprising the horizontal members 10, the vertical members 11, 12 and 13, and the connecting horizontal members 14 and 15, the upper horizontal members 15 being connected by means of connecting top pieces 16. Between the horizontal members 10 I arrange the angle iron guide members 17 along which the cake of ice is moved, said cake of ice being moved through the medium of the endless chain 18 traveling around the sprockets 19 and 20 supported in brackets 21 and 22, respectively, said chain having fingers 23 which engage the cake of ice and feed the same along the guideway 17. In order to compensate for the tapered form of the cake of ice I employ a compensating lug 24 which is applied to the endless chain and upon which the narrow end of the cake of ice 25 rests, this lug or member 24 being of just sufficient height and so placed as to elevate the tapered end of the cake so that as said cake is fed along in a horizontal direction the oppositely disposed horizontal saws 26 will score the cake along the true median line thereof. The saws 26 are mounted upon the lower ends of the shafts 27, which shafts are attached to members $11^B$ and $11^C$ which in turn are connected to the upright members 11 and $11^A$. The shafts 27 are provided with beveled gears 28 at their upper ends, which gears mesh with beveled gears 29 mounted upon the shafts 30, said shafts being journaled in suitable bearings connected to the uprights 11, $11^a$, 12 and 13. One of the shafts 30 is provided with a pulley 31 around which travels a bead 32 driven through the motor shaft 33 and both of the shafts 30 are provided with gears 34 meshing with intermediate reversing gears 35 so that the horizontal saws 26 can be driven in the proper direction. Mounted upon the shafts 30 are a series of vertical saws 36, these saws being so spaced as to provide the vertical score marks upon opposite sides of the cake of ice at the proper places and this scoring is accomplished as the cake of ice which has been previously horizontally scored, is moved upwardly between the vertical saws 36 and in order to accomplish this vertical movement I employ two sets of endless chains 37 and 38, the chains 37 traveling over the sprockets 39 and the chains 38 traveling around the sprockets 40. The chains are so arranged that the rear flight of the chain 37 is moving upwardly at the same time and at the same rate of speed as the rear flight of the chain 38 and the upper flight of the chain 37 is moving forwardly at the same time, and at the same rate of speed as the upper flight of the chain 37.

These movements I accomplish by providing a worm wheel 41 upon one of the shafts 30, which worm meshes with the worm gear 42 mounted upon a shaft 43 carrying a sprocket 44 driving a chain 45 passing around the shaft 46 which also carries one of the sprockets 40, preferably the one at the lower and forward end of the device. The other lower sprocket 40 communicates its motion to a sprocket 47, driving a sprocket chain 48 which in turn transmits its motion to the lower sprocket 39 thereby driving the chain 37. As before stated these sprockets and chains are so positioned and of such size that the endles chains 37 and 38 travel at exactly the same rate of speed. The rearmost lower sprocket 39 also transmits motion through the sprocket chain 49 to the sprocket 19 of the feed chain 18 so that by this arrangement one motor is sufficient to feed the cake of ice along, score the same horizontally, elevate it and score it vertically, and then discharge it horizontally from the scoring device. After the cake of ice is scored horizontally by passing between the horizontal saws 26, it is fed along between the flights of the chains 37 and 38 as indicated in dotted lines in Fig. 1 and when it reaches the limit of its forward movement it is then engaged by lifting fingers 50 carried by the chains 37 and 38, these lifting fingers 50 extending inwardly towards each other and the fingers carried by the rear flights of the chain 37 will be in line with the inwardly projecting fingers carried by the rear flights of the chains 38 and as these rear flights move upwardly in unison, the cake of ice will be lifted vertically, passed between the saws and then as the fingers move forwardly the cake of ice will be fed along in the direction of the arrows and will be discharged upon the delivery chute 51. In the meantime the operative parts are returned to their positions ready to receive and operate upon the next cake of ice.

Having thus described my invention, what I claim is:

1. In a device of the kind described, the combination with a frame, of horizontal and vertical saws arranged therein and means for rotating the same, an endless feed chain having a compensating lug and adapted to feed a cake of ice between the horizontal saws, endless chains for raising said cake of ice between the vertical saws, and delivering the scored cake to a delivery chute.

2. In a device of the kind described the combination with a frame, of horizontal and vertical saws arranged therein and means for rotating the same, and endless feed chains for moving the cake of ice between the horizontal saws, and endless elevating chains for raising said cake of ice between the vertical saws, said chains also delivering the scored cake away from the frame.

3. In a device of the kind described, the combination with a frame having horizontal and vertical saws and means for moving the same, of means for feeding a cake of ice between the horizontal saws and successive pairs of endless chains for elevating said cake of ice between the vertical saws, and delivering the scored cakes of ice from the machine.

4. In a device of the kind described, the combination with a frame having horizontal and vertical scoring saws and means for operating the same, a horizontally moving feed chains, endless elevating chains, lifting fingers carried by said elevating chains and moving in unison to lift a cake of ice vertically between the vertical saws, said chains and fingers serving to also deliver the scored cake of ice from the machine.

5. In a device of the kind described, the combination with a frame, of horizontal scoring saws and vertical scoring saws and means for rotating the same, an endless feed chain for feeding a cake of ice between the horizontal scoring saws, the endless chains 37 and endless chains 38 provided with lifting fingers 50 together with means for moving said chains 37 and 38 in the manner described.

In testimony whereof, I hereunto affix my signature.

MICHIEL J. ULINE.